March 4, 1930. C. H. BEHNKE 1,749,462
RETAINING DEVICE FOR CAPS
Filed March 25, 1927
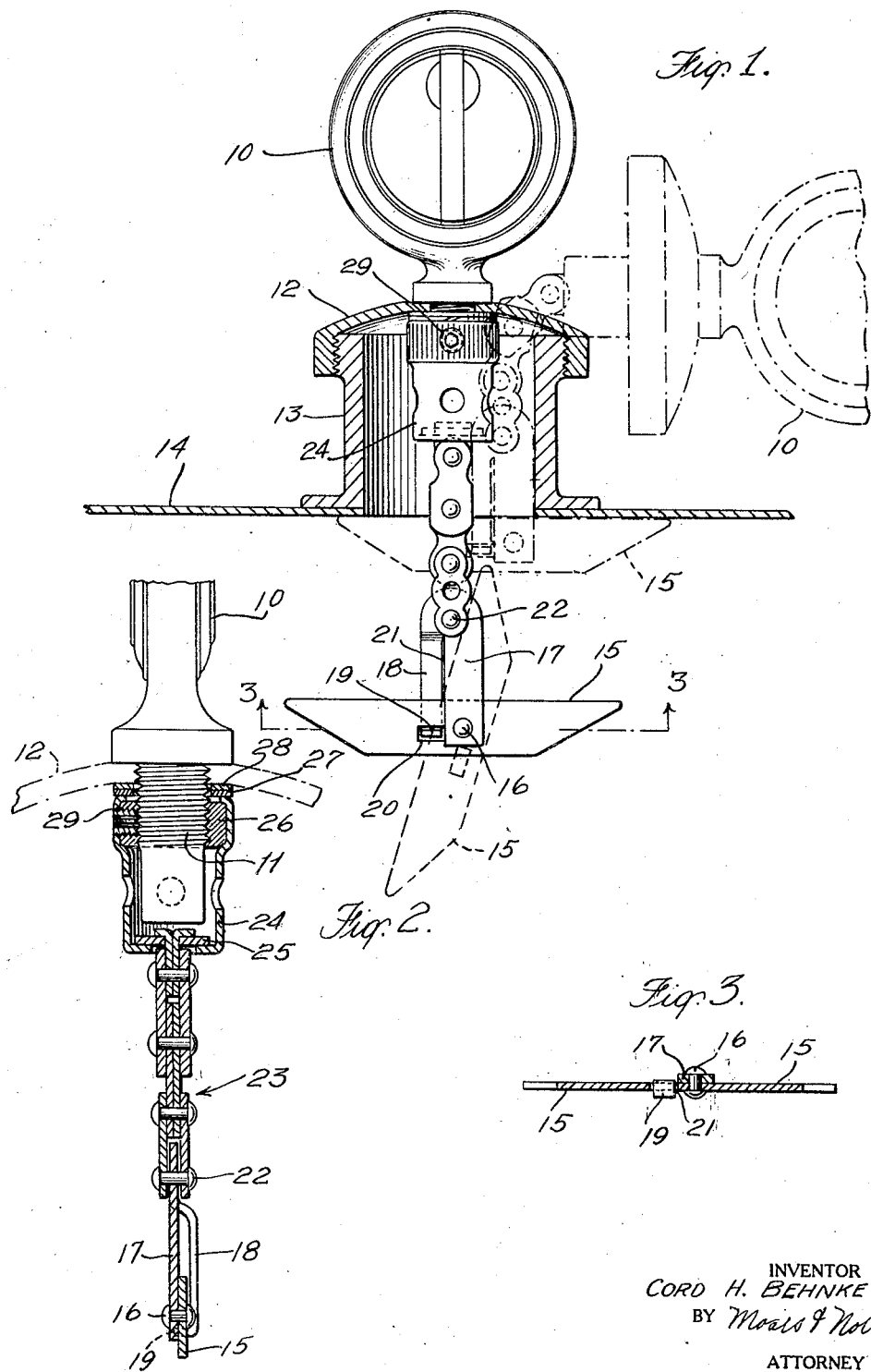
INVENTOR
CORD H. BEHNKE
BY Morris & Nolte
ATTORNEY Patented Mar. 4, 1930

1,749,462

UNITED STATES PATENT OFFICE

CORD H. BEHNKE, OF FLUSHING, NEW YORK, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

RETAINING DEVICE FOR CAPS

Application filed March 25, 1927. Serial No. 178,177.

This invention relates to retaining devices for radiator caps of automobiles and particularly for radiator caps equipped with instruments such as motor heat indicating instruments now in general use on motor vehicles. The general object of this invention is to provide a new and improved retaining device which is simple and rugged in structure, economical to manufacture and easy to apply; and which when applied will render very difficult the theft of a radiator cap or a cap with such an instrument applied thereto.

Other objects and advantages will hereinafter appear.

In the drawings forming a part of this specification:

Figure 1 is an elevation, partly in section, illustrating a preferred form of the invention applied to a radiator cap and radiator;

Figure 2 is a side elevation partly in section of the structure shown in Figure 1; and Figure 3 is a view in section taken along the line 3—3 of Figure 1.

Referring to the drawing, the invention is illustrated in connection with a heat indicating instrument 10 of a well known form having a threaded stem 11 adapted to project through a hole in a radiator cap 12 which may be threaded internally to screw on a threaded end of a neck 13 projecting from a radiator 14. The instrument 10 may be secured to the radiator cap 12 in a manner to be described hereinafter.

The securing device or anchor is shown as comprising a member 15, which may be tapered on its lower side near its ends, and straight in its upper edge, pivotally secured, as by a rivet 16 somewhat to one side of its middle, with the lower end of a member or link 17 provided with a spring arm 18, preferably integral therewith, and having at its lower end an offset lug or latch 19 adapted to enter an opening or latch seat 20 provided therefor in the member 15, when the member 15 is substantially perpendicular to the link 17. The construction of the member 15 with its straight upper edge and ends tapered at their lower sides tends to economy in manufacture, ease of insertion in the neck 15, and effective locking.

As herein disclosed, the spring arm 18 is integrally connected at its upper end with the link 17 and separated therefrom along the rest of the length thereof by a slit 21, and is offset so as to engage the member 15 at the face opposite that engaged by the link 17. Above the upper end of the slit 21, the link 17 is connected as by a rivet 22, with the lower end of a chain 23 which may be composed of pairs of links connected by rivets, the links of alternate pairs being close together and the links of the other pairs being spaced apart to receive therebetween at their ends the ends of the closely arranged links.

Preferably the upper end of the link 17 is interposed between two spaced apart links at the lower end of the chain 23 and two closely arranged links at the upper end of the chain 23 pass freely through an opening in the lower end of a shell 24 and through a slot in a disc 25 to the upper side thereof where they are bent outwardly to engage the upper face of the disc and secure the chain thereto, the disc 25 overlying portions of the lower end of shell 24 at the sides of said opening, thus effecting a swivel connection between the chain 23 and shell 24.

The shell 24 embraces at its upper end an internally threaded ring 26 adapted to screw on the threaded stem 11 of the instrument 10 and to grip washers 27 and 28 between the upper end of the shell and the top of the radiator cap. The shell 24 and ring 26 may be locked on the stem 11 by means of a set screw 29 preferably provided with a wrench socket, hexagonal for example, and the removal of the set screw may be made difficult by filling the socket with material which is hard to remove. For example, a lead ball may be placed over an end of a wrench socket and forced thereinto until the socket is filled.

The retaining device is installed in the following manner: The spring arm 18 is sprung away from the anchor member 15 sufficiently to withdraw the lug 19 from the opening 20 and the anchor member 15 is swung about the rivet 16 to bring the part thereof above the opening 20 opposite the end of the lug 19 as indicated in Fig. 1, the end of the lug 19 then resting against the member 15 and acting frictionally to hold it in such position with relation to link 17. The member 15 is then inserted in and dropped down the radiator neck 13; the chain 23 being manipulated to bring the upper end of the member 15 into engagement with the upper part of the radiator around the opening at the lower end of the neck 13, and the chain is then pulled from above to swing the member 15 about the rivet or pivot 16 until the lug 19 snaps into the opening 20.

In some cases the member 15 may be operatively positioned in the top of the radiator before the shell 24 is threaded on the stem 11 and the stem 11 may then be screwed into the ring 26 and locked in position by the set screw 29. In other cases the shell and stem may be connected together first, and the member 15 dropped into the radiator neck and worked into effective position. In all of these cases the instrument 10 and radiator cap will be secured in a theft-proof manner to the radiator. It should be understood that the chain 23 is made of such length as to permit the instrument 10, when the cap 12 is unscrewed, to tilt sufficiently to permit the radiator to be filled without interference by the radiator cap.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

Having thus described my invention, I claim:

1. A retaining device for a radiator cap, including a link flexibly but permanently connected with said cap, an anchor member pivoted substantially centrally on said link, and spring means integral with said link to lock said member substantially perpendicular to said link upon movement to such position but maintained retracted, and ineffective when said member and said link are out of such perpendicular relation.

2. A device for securing a cap to an automobile radiator, including a bar to be trapped in the radiator, and a link pivoted to said bar adjacent the middle thereof and having an offset resilient arm formed to snap into an opening in the bar when the latter is in effective position with respect to said link and to be held in retracted position by said bar when otherwise positioned.

3. A device for securing a cap to an automobile radiator, including a bar to be trapped in the radiator, and having a latch seat, a sheet metal member pivoted at one end to said bar intermediate the ends thereof and having a spring arm integral therewith at one end and formed with a latch member to snap into said seat when said bar is in effective position with respect to said member and to be maintained in retracted position by engagement with said bar when the bar and member are in other angular relations.

4. A device for securing a cap to an automobile radiator, including a bar to be trapped in the radiator and having a latch opening, and a sheet metal member pivoted to said bar near the middle thereof and having at one side edge a spring arm connected therewith at its upper end and offset from the plane of said sheet metal member to permit said bar to pass therebetween, said arm being offset in the opposite direction at its lower end to provide a lug to snap into said latch opening and lock said bar in effective position.

5. A device for securing a cap to an automobile radiator, including a bar to be trapped in said radiator, said bar having a straight upper edge and being tapered on its lower side at its ends, a yoke having one arm thereof pivoted to said bar substantially at the middle thereof, and the other arm forming a spring device effective to lock said bar and said link in perpendicular relation but held in retracted condition when said bar and said link are out of such perpendicular relation.

6. A retaining device for use with a radiator cap equipped with an instrument having a stem projecting through a hole in said cap, including a link flexibly but permanently connected with said stem, a bar to be trapped in the radiator and pivoted substantialy at its middle to said link, and spring means to lock said bar perpendicular to said link and to hold it frictionally in any other angular position.

In testimony whereof I have affixed my signature to this specification.

CORD H. BEHNKE.